July 16, 1940.
F. M. MANUEL
2,208,503
EDUCATIONAL DEVICE
Filed April 3, 1939
3 Sheets-Sheet 1
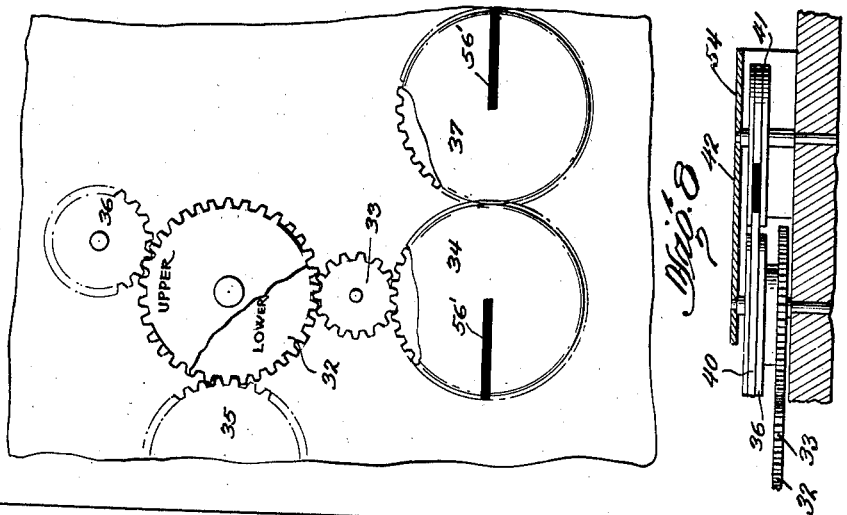
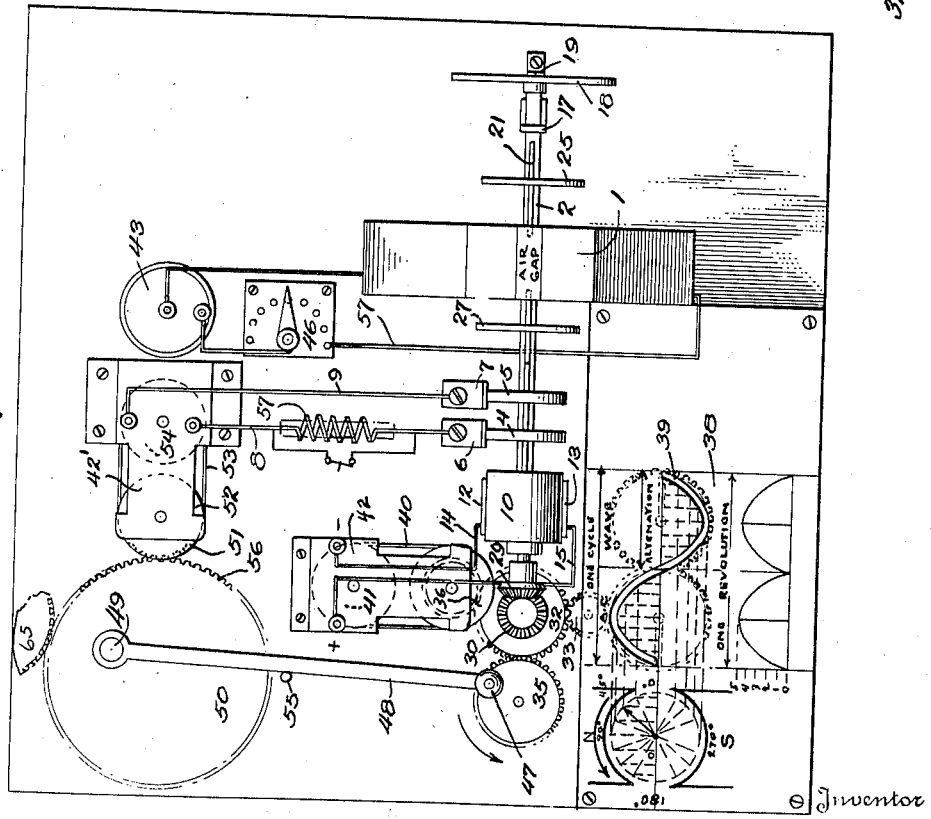
Inventor
*Forrest M. Manuel*
By *Albert Grobstein*
Attorney July 16, 1940.  F. M. MANUEL  2,208,503
EDUCATIONAL DEVICE
Filed April 3, 1939   3 Sheets-Sheet 2
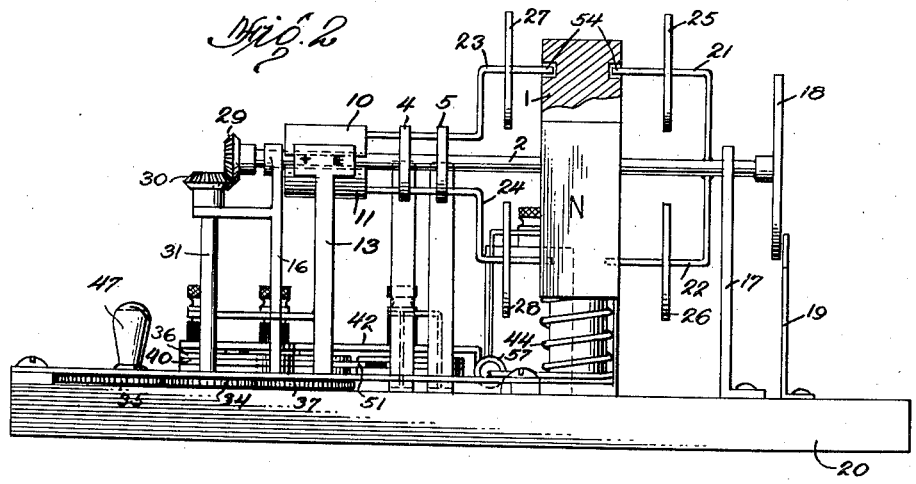
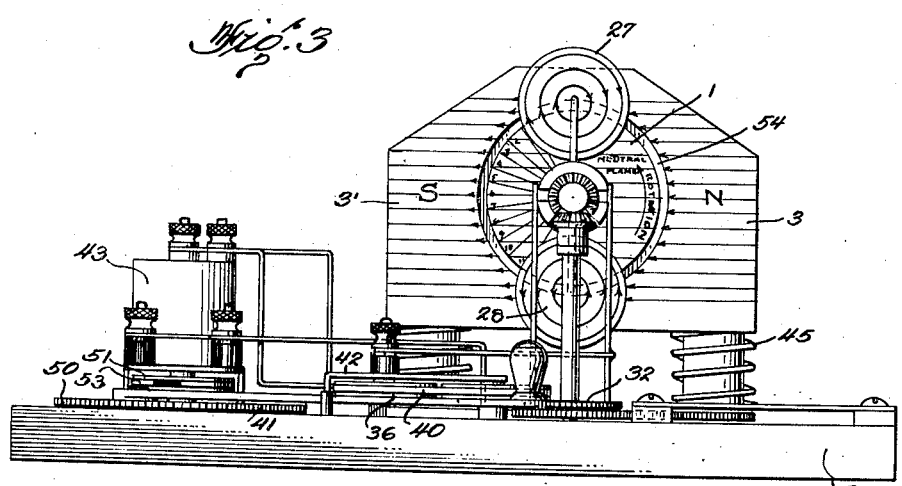
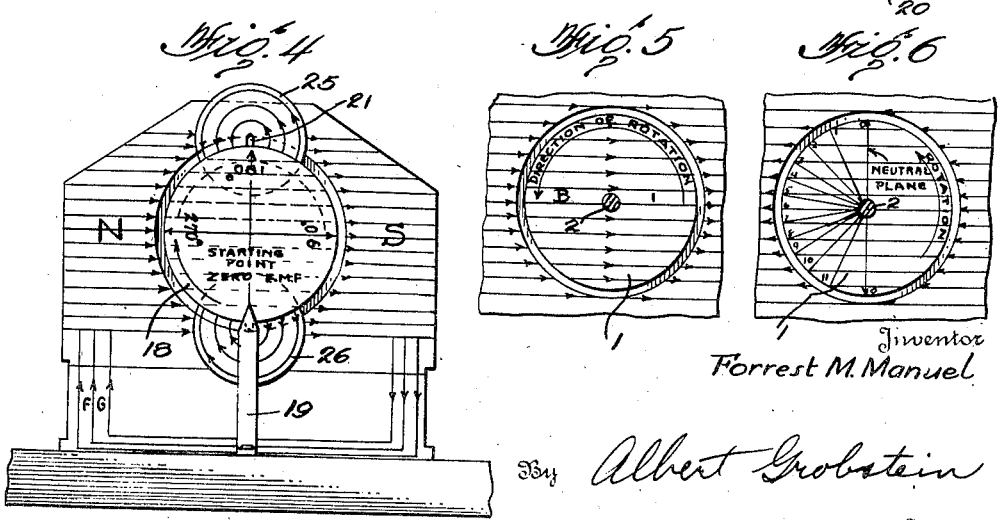
Inventor
Forrest M. Manuel
By Albert Grobstein
Attorney

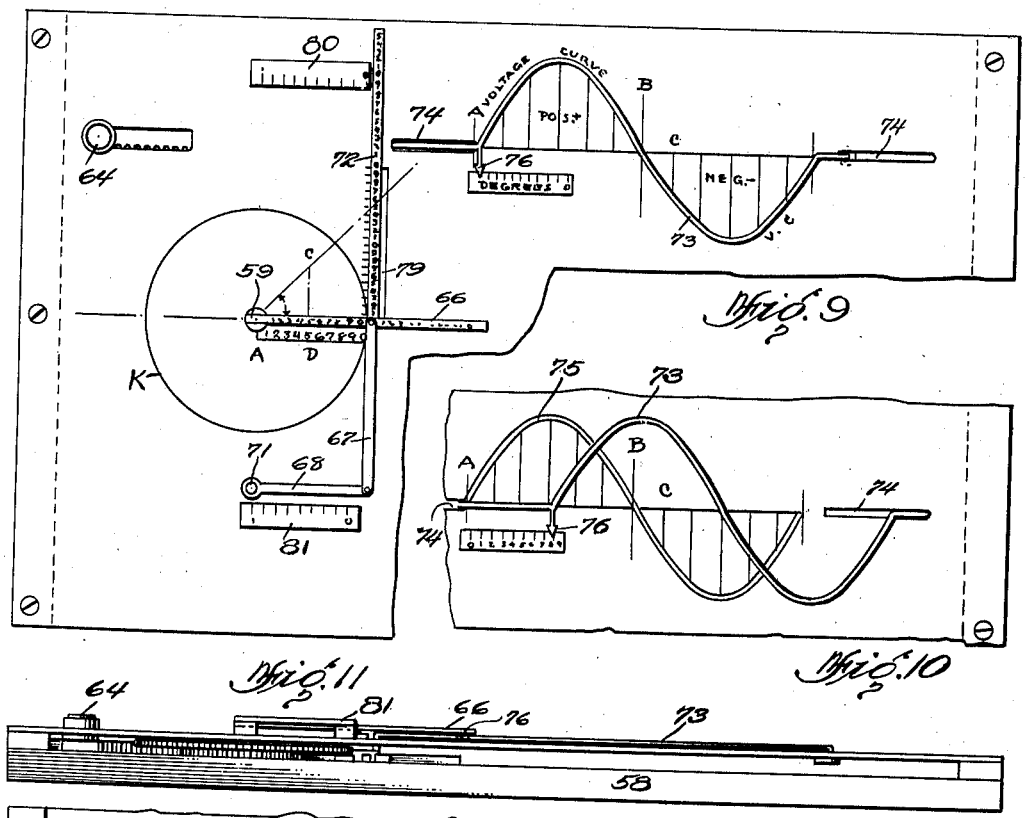
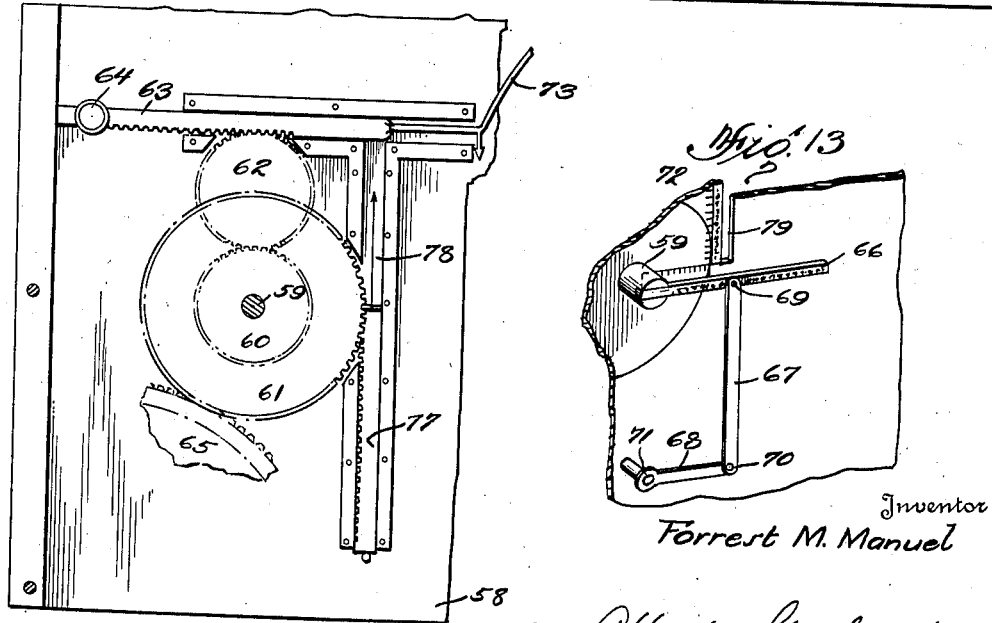

Patented July 16, 1940

2,208,503

UNITED STATES PATENT OFFICE 2,208,503

EDUCATIONAL DEVICE

Forrest M. Manuel, Washington, D. C.

Application April 3, 1939, Serial No. 265,808

19 Claims. (Cl. 35—19)

This invention relates to an educational device, primarily for demonstrating, illustrating and instructing the basic principles of generation of electric current. The device may be used in the classroom for teaching and illustrating the principles of an alternating current generator, a direct current generator, a rotary converter, a direct current motor, and a synchronous motor; with coordinated mechanism showing the variations of current strength with their relative positive and negative directions in reference to the cutting of the magnetic lines of force.

Other objects are to provide alternating current and direct current circuits respectively illustrated by moving belts which are designated by markings thereon and synchronized with the armature conductor. Other objects are to provide a working model for the classroom to demonstrate the action of a dynamo coordinated with the graphic representation of an alternating current generated thereby; the portrayal of a sine curve generated by an alternating current rotating vector; the provision of means to represent simple direct dynamo construction with graphic representation of a direct current. Further objects of the invention are to illustrate the various parts and functions of electrical generating equipment together with means associated therewith for visual teaching of various electrical laws and phenomena.

Another object is to illustrate angle of lag, power factor, apparent power and true power in an electrical system and apparatus for such illustration.

Other objects of the invention will appear as the description thereof hereinafter proceeds.

Figure 1 is a plan view of the educational appliance relating to current generation.

Figure 2 is a side elevation view of Figure 1 partly in cross-section.

Figure 3 is an end elevational view of the left-hand side of Figure 1.

Figure 4 is an end elevational view of the right-hand side of Figure 1.

Figure 5 is a detail view of the armature core of Figure 4 with the three front circular elements removed.

Figure 6 is a detail view of the armature core of Figure 3 with the gearing and two circular elements removed.

Figure 7 is a plan view of the gearing lying flat on the base in Figure 1 with cover and charts removed.

Figure 8 is a detail view in elevation of the gearing and belt arrangement of the pulley assemblies in Figure 1.

Figure 9 is a plan view of the device for explaining and teaching power factor in an electrical system, the voltage and amperage being shown in phase.

Figure 10 is a view of the sinusoidal curve of Figure 9 with the voltage and amperage curves being out of phase.

Figure 11 is an elevation of the device shown in Figure 9.

Figure 12 is a detail view of part of Figure 9 in plan with the top cover removed.

Figure 13 is a perspective view of the mechanical movement and circular chart of Figure 9.

Referring to Figures 1 to 6, the numeral 1 is a representation of an armature core having a shaft 2 passing therethrough between fixed field magnets 3 and 3'; which field magnets are separated by an air gap at the top and bottom portions thereof. The field magnets are marked with horizontal parallel lines as shown in Figures 3 and 4 to indicate magnetic lines of force of opposite polarity passing therethrough. As shown in Figures 5 and 6, opposite faces of the armature core 1 are marked with parallel lines representing the passage of the lines of force therethrough from one field magnet to the other. In a real dynamo this core is replaced by a real armature core, composed of an iron core and windings thereon; but the core herein is made in one piece with the field magnets to illustrate magnetic effects that take place in current generation.

This armature core is in fixed relation to the magnets, and the shaft 2 rotates through a hole in the center of the armature core. The armature core has on its one face shown in Figure 6 parallel markings of lines of force passing therethrough, and in addition angular markings radially outward from the center, such angular markings depicting different angles and sectors with a zero line running vertically through the center of the armature core from the top air gap to the bottom air gap. These indicate the arc in which lines of force are cut from the neutral point. The armature core has on its other face, shown in Figure 5, parallel lines of force and an arrow showing direction of rotation. The shaft 2 has fixedly secured thereon two collars 4 and 5 respectively which represent collector rings and rotate therewith, and these rings brush against elements 6 and 7 respectively, to which are joined lead wires 8 and 9 respectively. Also secured to the same side of the shaft 2 as the collars 4 and 5 are hemispherical segments 10 and 11 representing commutator brushes which make brushing contact with the elements 12 and 13, to which are attached lead wires 14 and 15. The shaft 2 is supported on standards 16 and 17 and on the right end of said shaft an indicating disc 18 is fixedly secured thereto and rotates therewith. The disc 18 coordinates with a pointer 19 supported on the supporting base 20 of the device. Fig. 4 shows relation of 18 and 19 and markings thereon. The rotatable shaft 2 carries wires 21, 22, 23 and 24 rotatable therewith and discs 25, 26, 27 and 28 mounted upon said wires and facing opposed sides of the armature core. The wires 21 and 22 which fixedly carry the discs 25 and 26 are soldered to the righthand position of the shaft 2 as shown in Figure 2, while the wires 23 and 24 which carry the discs 27 and 28 pass in parallel relation through the collars 4 and 5 and terminate in being fixedly secured to the hemispherical segments 10 and 11. The end of the shaft 2 which passes through the supporting strut 16 is provided with a toothed spur gear 29 which coacts with the teeth of the gear 30, which in turn is fixed to a rotatable vertical shaft 31 having a gear wheel 32 fixedly secured to the bottom thereof. Gear wheel 32 is provided with two upper and lower parallel sets of teeth around the outside periphery thereof, the lower set of teeth being in coacting engagement with gear 33, and which in turn is in coacting toothed engagement with the teeth of the gear 34. The lower teeth of gear 32 are also in coacting engagement with the gear wheel 35, while the top teeth of gear 32 are in coacting engagement with gear teeth secured to the bottom of pulley wheel 36. It will be observed from Figure 7 that gear wheel 32 has teeth missing in the top set at opposite sides of the periphery of the same, for reasons hereinafter explained.

The gear wheel 34 has its teeth in coactive engagement with the gear wheel 37. The flat gear wheels 34 and 37 are each provided with a radial marking thereon extending from each of their centers to the outer circumference as shown in Figure 7. A chart generally designated by numeral 38 (shown in Fig. 1) takes the form of a cover element for gears 34 and 37 and this cover element 38 contains a snake-like slot 39 in the form of a sinusoidal curve which exposes gears 34 and 37 therethrough along the opening of the slot, and permits a portion of the radial marking to be seen therethrough at various points along the slot opening upon rotation or actuation of the gear wheels 34 and 37.

Referring now to the discs 25, 26, 27 and 28, they are provided on each of their respective back and front faces with concentric markings and arrows indicating direction of induced current or magnetic whirls, as shown in Figures 3 and 4.

The pulley element 36, rotatably supported upon a vertical pin, has a groove in the periphery thereof to receive an endless belt 40 which also operates in a corresponding peripheral grooved pulley 41, and which pulley 41 is also rotatably supported on a fixed pin.

Covering the pulleys 36 and 41 is a sheet metal bracket 42 having binding posts wherein terminate the wires 14 and 15, to negative and positive polarity. The belt 40 has a black marking or indication thereon at a specified point, which marking makes one revolution over the orbit of the belt for each revolution of the wires 21, 22, 23 and 24 with the revolving shaft 2. The gear wheel 35 is provided near its periphery with a vertical pin 47 which functions in part as an operating handle or prime mover for rotating the various parts in illustration of the principles of generation of electricity. The battery element 43 has its positive and negative connections joined to the magnetic coils 44 and 45, which battery and resistance element 46 illustrate an exciter for the generator. The pin 47 which serves as a handle for rotating the gear wheel 35 is eccentrically placed at a point near the circumference of the wheel 35 and serves also as a bearing for the connecting rod 48, the other end of which is eccentrically pivoted at 49 on the gear wheel 50, which gear wheel in turn coacts with the teeth of a gear wheel 51 to the top of which is secured the pulley wheel 52. The gear wheel 50 is also in toothed engagement with gear wheel 65 for actuation (if desired) of gear 61 of the mechanism shown in Figure 12. The pulley wheel 52 (Figure 1) has a groove in its outside periphery for the reception of a belt 53 which is also received in the groove of a corresponding pulley 54, both pulleys 52 and 54 being mounted for rotation on upright pins. The belt 53 has a marking designated thereon at a specified point, and pulleys 52 and 54 are covered by a cover 42' having contact terminals thereon for the lead wires 8 and 9.

The chart element 38 with its sinusoidal slot 39 has a designation thereon of a rotating vector which is coordinated with said sine curve to give the visual sine curve generated thereby as a point revolves about between the poles at a uniform rate of speed and the angle constantly changing. The chart 38 also has thereon the graph of a direct or pulsating current of a single coil such as would be caused by one revolution of the armature.

It will be noted that none of the parts heretofore described actually generate current, the purpose of the devices herein being for instruction, and the elements are made to simulate, where possible, electrical construction; obviously some elements, such as the pulleys, belts, charts and cooperative mechanism are not reproductions of any actual electrical constructions.

In the use of the present device in the classroom, actuation of the handle 47 will cause rotation of gear 32 and shaft 2, together with all of their related respective parts. With the rotation of the shaft 2, the wires 21, 22, 23 and 24 will also rotate within the circular grooves 54 which represent the space between the outside periphery of the armature core 1 and the adjacent field magnets 3 and 3'. The disc 18 will rotate with the shaft 2 relative to the pointer 19 and will indicate the degree of armature inductor (wires 21, 22, 23 and 24) from the neutral point. The wires 21, 22, 23 and 24 may be considered to be a single strand of an armature cutting the lines of force in a field magnet. The discs 25, 26, 27 and 28 fixed to said wires indicate magnetic whirls of induced current, and are useful in teaching Lenz's Law of Induced Currents, etc. By referring to Figures 3 and 4, these discs are painted, or otherwise marked, with concentric circles and arrows. These circles and arrows are on both sides of each disc, being in red color on the faces showing the figures 3 and 4, and black color on the faces not showing; the black arrows being pointed in a direction reverse to the red arrows.

The painting or coloration of various parts will be understood to be in the interest of simplicity of instruction. It is preferred to color the field magnet black and the armature core 1 white, with the air gaps white. The top wires 21 and 23 are white, and the bottom wires 22 and 24 red. The segment 10 is white and the segment 11 red. The collector ring collars 4 and 5 are not distinguished from each other in color, since alternating current polarity is constantly reversing, and both leads 8 and 9 are also the same color. The contact brush 13 is always positive, while the brush 12 is always negative, since they portray direct current only.

It will be noted that the rotation of gear 32 causes continuous rotation of gear 36 and belt 40 thus travels in a single direction around its orbit. This travelling of belt 40 in one direction with the rotation of shaft 2 (and the armature) can be clearly seen by the black mark indicated at a point on the belt (Figure 8). This indicates the continuous direction of direct current. However, direct current is pulsating in actual generation, and this pulsating effect is obtained by removal of teeth from opposite sides of the top teeth of gear wheel 32. The belt 40 thus pauses twice in each complete revolution it makes.

The illustration of alternating current direction is shown by the belt 53 with its marking at a point thereon. Due to the stop 55 which is a pin curbing the full movement of element 48 and the eccentricity of pin 49, the rotation of gear 35 in a complete revolution causes the gear 50 to oscillate back and forth in an arc defined by the teeth 56. These teeth coact with the pulley gear 52 so that the pulley 52 rotates 360° and then reverses, causing the belt 53 to take a corresponding alternating reversing path or direction; depicting two alternations or one complete cycle of an alternating current per each revolution of wheel 35. The view shown in Figure 8 is diagrammatic of the details of both pulley arrangements (direct and alternating current) insofar as the pulleys alone are shown with their belts, and without regard to the type of motion transmitted by the agencies indicated in Figure 1.

The radial markings 56' on the gears 34 and 37 respectively, show only in small part through the sinuous slot 39 upon rotation of the gears 32 and 33. The effect when seen looking down on Figure 1 and the slot 39 is the movement of a black dot from one end of the slot to the other, beginning with the extreme left and travelling to the extreme right. This dot shows the character and polarity of the alternating current with the rotation of the shaft 2 and its various positions with respect to the field.

In view shown in Figure 4, the magnetic circuit linkage of lines of force is indicated by the arrows. In the view shown in Figure 1, the element 57 and core illustrates reactance for the purpose of explaining angle of lag, power factor or cosine of the angle of lag, etc. It will be noted that this reactance may be shunted by the switch means shown. A shunt effect can also be obtained by use of a condenser, as is well known in the electrical art.

Referring specifically to Figures 9 to 13, the numeral 58 represents a base having an axis or pin 59 therein carrying a gear 60 to which is welded or brazed a top gear 61. The gear 60 coacts with a gear 62 which in turn coacts with ratchet rod 63 operating in a slot formed by guides. The linkage shown in Figure 13 is carried by pin 59 and rotates with such pin and with gear wheel 61, so that movement of wheel 61 carries rod 66 secured thereto.

In the operation of the device shown in Figures 9 to 13, motion is imparted to rod 63 by means of the handle 64 in a manual manner; or this motion may be imparted by gearing of the wheel 61 with the wheel 50 shown in Figure 1, through the medium of gear wheel 65. Gear wheel 65 (shown broken away) has a diameter which is twice the diameter of large gear wheel 61. Obviously, gear 65 may be disconnected from gear 50, and motion imparted to gear 61 by means of reciprocation of rod 63 at handle 64.

With the motion thus imparted to ratchet bar 63, movement of rod 66 in a counter-clockwise direction is accomplished, the said movement of 66 carrying with it linkage elements 67 and 68, the bar 67 being pivoted to 66 at pin 69 and pivoted to 68 at pin 70. Rod 68 in turn is rotatably pivoted around the fixed pin 71.

The rod 66 has scale markings thereon representing apparent power or K. V. A., the markings being from the center of circle K to a point corresponding to its circumference; and where the rod 66 extends beyond the circumference, scale markings on the rod indicate impedance as a total value from the center of circle K to a point of tangency with the circle.

With no reactance (57, Figure 1) in the circuit, true power or kilowatts is designated by scale markings (seen in Figure 13) beneath the rod 66 on the horizontal radius of circle K. When there is reactance in the circuit, a movement of rod 66 counter-clockwise defines an angle with this horizontal true power line, and the link 67 travels vertically and horizontally to the left of its position in Figure 9, forming a right triangle with rod 66 as hypotenuse, and true power line as the base of the triangle. Since with this motion, the link 67 is now within the circle K, it intersects the true power line radius at a point within the circle. Where the rod 66 intersects the scale 72 beyond the circumference of circle K, the reactive power is thus marked off on said scale, said reactive power being defined by the distance from the said intersection to the point of tangency, such point being where the true power line meets with said circle K. Thus a movement of rod 66 and linkage carried thereby affords a quick visualization of the relationship of true power, apparent power, and reactive power. It will be observed that a movement of ratchet rod 63 always accompanies movement of rod 66 and linkage carried thereby. The ratchet rod 63 carries at its outer end a wire 73 bent in the form of a sinuous curve, and movable longitudinally in a slot 74. This wire 73 represents a voltage curve, but it will be understood that where amperage leads voltage, instead of lag as hereindescribed, the wire 73 represents amperage, and vice versa. In Figure 10, the line or curve 75 represents amperage, but may represent voltage as explained with regard to Figure 9. Figure 10 shows a chart of a sine curve with the wire 73 out of phase with the markings on the chart; in other words, the wire 73 is out of phase with the amperage sine curve which is immovably designated on the chart. In both Figures 9 and 10, for convenience wire 73 and curve 75 are shown of the same height at the knee of the curve, but obviously induced E. M. F. may be shown with a lower knee than the amperage curve. The pointer 76 indicates the phase difference in degrees. Movement of the gear wheel 61 will cause movement of the linkage shown in Figure 13 and also cause simultaneous movement of the wire 73, so that the angle of lag and its functions will be depicted geometrically and also sinusoidally.

The rod 77 may have scale markings thereon and moves tangentially to the wheel 61 and is geared thereto. As the wheel 61 is rotated counter-clockwise, the rod 77 moves in the slot 78 in the direction of the arrow, and its movement is observable through the cover slot 79, so that the student may visualize the correlation between functions such as sine and tangent values. The scales 80 and 81 are marked guides, that are slightly elevated from the board to support a straight edge or ruler, so that a student may place a straight edge on said guides to determine the apparent power at any point along the rod 66 as a hypotenuse.

The linkage shown in Figures 9 and 13 depicts relationship of true power, apparent power, and reactive power. Analogous illustration of ohmic resistance, active voltage, or active amperes may be represented where the true power line now is designated; ohmic reactance, reactive voltage, or reactive amperage may be represented where reactive power is now designated; apparent amperage or apparent voltage may be represented where apparent power and impedance are now designated. Thus the linkage gives wide flexibility of instruction.

Modifications of the described devices may be made without departing from the spirit of the invention, and the same is to be limited only by the scope of the appended claims.

What I claim as my invention is:

1. An educational appliance for teaching electricity which comprises an element representing the field magnet of a dynamo and having lines thereon representing lines of force, an element representing an armature core through which said lines pass, a rotatable shaft passing through the center of said armature core, and means on said shaft rotatable therewith bearing indicia indicating the characteristics of the current at various stages of the revolution of the armature.

2. An educational device for the visual instruction of the principles of electricity including an armature core element, a field magnet, a rotatable shaft depicting the moving relationship of an armature and said magnet, hemispherical commutator segments secured to the end of said shaft, brush elements contacting said segments, connecting wires leading from said brush elements to binding posts indicating polarity, and means actuated by the rotation of said shaft to indicate the pulsating constant direction of the direct current produced.

3. An educational device for the visual instruction of the principles of electricity including an armature core element, a field magnet, a rotatable shaft depicting the moving relationship between an armature and said magnet, collars fixedly secured to said shaft representing collector rings, means contacting said collars, lead wires connecting said contacting means with terminals, and means actuated by the rotation of said shaft to indicate the alternations of the alternating current produced.

4. In a demonstrational device for teaching the production of electricity, an element representing a field magnet and the direction of magnetic flux therethrough, an element representing an armature core depicting the lines of force of the magnetic flux passing therethrough from one position of the magnet to the other, a rotatable shaft indicating the relative movement between an armature and said field magnet through a revolution of 360 degrees, means actuated by said shaft to indicate direction of current and separate means actuated by said shaft to indicate the value of said current at any point of the relative movement between the armature and the field magnet.

5. In a demonstrational device for teaching the production of electricity, an element representing a field magnet and the direction of magnetic flux therethrough, an element representing an armature core depicting the lines of force of the magnetic flux passing therethrough from one portion of the magnet to the other, a rotatable shaft indicating the relative movement between an armature core depicting the lines of force of revolution of 360 degrees, means actuated by said shaft to indicate direction of current and means on said shaft indicating magnetic whirls resulting from induced current.

6. In an educational device of the class described, a magnetic field element, an armature shaft rotatable with respect to said magnetic field element, and wire means representing inductors secured to and rotatable with said shaft illustrating the manner of cutting lines of force of a magnetic flux emanating from said field element and the disposition of the resulting current.

7. In an educational device of the class described, a magnetic field element, an armature shaft rotatable with respect to said magnetic field element, and wire means secured to and rotatable with said shaft illustrating the manner of cutting lines of force of a magnetic flux emanating from said field element and the disposition of the resulting current, and means carried by said wire means indicating magnetic whirls resulting from induced current.

8. In an educational device of the class described, a magnetic field element, an armature shaft rotatable with respect to said magnetic field element, and wire means secured to and rotatable with said shaft illustrating the manner of cutting lines of force of a magnetic flux emanating from said field element and the disposition of the resulting current, said wire means being in two parts designating a loop located 180 degrees apart and opposed to each other with respect to the shaft.

9. In an electrical educational device, means representing a magnetic field and armature having relative rotation, means actuated by said rotation comprising a first wheel having a pin located at a point on its periphery, a second wheel having a pin located at a point eccentric to its center, a connecting rod joining said pins, means geared to said second wheel comprising a pair of pulleys, an endless belt carried by said pulleys and having markings designated thereon, said belt being operable upon relative rotation of said armature and field in one direction to revolve in alternate directions synchronously therewith.

10. An educational appliance for teaching electrical principles comprising a linkage rotatably mounted at the center of a charted circle, said linkage comprising at least a first arm extending outwardly from the center of the circle and a second arm pivoted on said first arm and depending therefrom, a sinusoidal curve chart, means for rotating said linkage to depict various geometric and trigonometric functions with the radius of the circle as a base, and means coacting with the rotating means for depicting sinusoidal curve variations simultaneously therewith.

11. An educational appliance for teaching scientific principles comprising a base support having a gear wheel rotatably mounted thereon, a second gear wheel having teeth coacting with the teeth of the first gear and rotatable therewith, a rod having ratchet teeth coacting with the teeth of the second gear wheel, an extension in the form of a sinuous wire carried at one extremity of said rod, and a sinusoidal chart over which said wire passes.

12. An educational appliance for teaching scientific principles comprising a base support having a gear wheel rotatably mounted thereon, a second gear wheel having teeth coacting with the teeth of the first gear and rotatable therewith, a rod having ratchet teeth coacting with the teeth of the second gear wheel, an extension in the form of a sinuous wire carried at one extremity of said rod, and a sinusoidal chart over which said wire passes, and a linkage rotatable with said first named gear wheel illustrating trigonometric functions corresponding to variations on the sinusoidal chart depicted by the wire.

13. An educational appliance for teaching scientific principles comprising a base support having a gear wheel rotatably mounted thereon, a second gear wheel having teeth coacting with the teeth of the first gear and rotatable therewith, a rod having ratchet teeth coacting with the teeth of the second gear wheel, an extension in the form of a sinuous wire carried at one extremity of said rod, and a sinusoidal chart over which said wire passes, and a third gear wheel having twice the diameter of said first named gear wheel secured to the same and rotatable therewith, and a second ratchet rod having teeth in coacting engagement with said third gear wheel, said second ratchet rod being operatively connected to means illustrating trigonometric functions corresponding to variations on the sinusoidal chart depicted by the wire.

14. An educational appliance for teaching scientific principles comprising a base support having a gear wheel rotatably mounted thereon, a second gear wheel having teeth coacting with the teeth of the first gear and rotatable therewith, a rod having ratchet teeth coacting with the teeth of the second gear wheel, an extension in the form of a sinuous wire carried at one extremity of said rod, and a sinusoidal chart over which said wire passes, and a third gear wheel having twice the diameter of said first named gear wheel secured to the same and rotatable therewith, and a second ratchet rod having teeth in coacting engagement with said third gear wheel, a circular chart superposed over said third named gear wheel, and a linkage rotatable with said first named and third named gear wheels illustrating trigonometric functions corresponding to variations on the sinusoidal chart depicted by the wire.

15. In a device of the class described, means for visualizing phase differences of induced E. M. F. and amperes; which comprises a base support, a circular chart and linkage including a rod rotatably mounted on a pin on said support defining the center of said circular chart, a link pivoted on said rod at a point defining the circumference of said circular chart, a second link pivotally mounted on said first link at one end, and at the other end pivotally mounted on the base support in alignment with the first named pin, and means coordinated with the rotation of said linkage to depict sinusoidal curve changes, said linkage denoting sine and tangent values with the circular chart simultaneously with phase differences in degrees with the coordinated means.

16. In an educational apparatus of the class described, means comprising a base chart having a circle thereon, and means rotatably mounted over said chart for visual representation of trigonometric functions theoretically applicable to the production of current and voltage in an electric generator.

17. In an educational device of the class described, means representing relative rotation of elements capable of generating electricity including a rotatable shaft, means actuated by rotation of said shaft comprising gear means having some of the gear teeth removed, a plurality of pulleys actuated by said gear means, an endless belt means carried by the pulleys having markings designated thereon, said belt means being synchronized with the rotation of said shaft to illustrate pulsating direct current, the pulsations of the belt means being produced by the absence of some of the gear teeth.

18. In an educational device of the class described, means representing relative rotation of elements capable of generating electricity including a rotatable shaft, means coordinated with the rotation of said shaft comprising coacting gears, a chart containing a sinusoidal slot located above said gears, and radial markings on said gears to depict the generation of a sinusoidal curve visually through said slot.

19. In a demonstrational device for teaching the production of electricity, an element bearing indicia adapting it to represent a field magnet, an element bearing indicia adapting it to represent an armature core, a rotatable shaft indicating the relative movement between an armature and said field magnet through a revolution of 360 degrees, means actuated by said shaft to indicate direction of current, and means actuated by said shaft to indicate the value of said current at any point of the relative movement between the armature and the field magnet.

FORREST M. MANUEL.

CERTIFICATE OF CORRECTION.

Patent No. 2,208,503.                  July 16, 1940.

FORREST M. MANUEL.

It is hereby certified that error appears in the printed specification of the above numbered patent requiring correction as follows: Page 4, second column, line 12, claim 5, strike out the words "core depicting the lines of force of" and insert instead --and said field magnet through a--; page 5, second column, line 29, claim 17, for "an" read --and--; and that the said Letters Patent should be read with this correction therein that the same may conform to the record of the case in the Patent Office.

Signed and sealed this 27th day of August, A. D. 1940.

(Seal)                                                         Henry Van Arsdale,
Acting Commissioner of Patents.